United States Patent [19]

Moriya et al.

[11] Patent Number: 5,202,864
[45] Date of Patent: Apr. 13, 1993

[54] SLIP-OFF PREVENTING TRACKING CONTROL APPARATUS

[75] Inventors: Mitsuro Moriya, Neyagawa; Hiroyuki Yamaguchi; Masayoshi Shioya, both of Hirakata, all of Japan

[73] Assignee: Matsushita Electric Industrial Co., Ltd., Osaka, Japan

[21] Appl. No.: 813,930

[22] Filed: Dec. 27, 1991

Related U.S. Application Data

[63] Continuation of Ser. No. 337,156, Apr. 12, 1989, Pat. No. 5,109,366.

[30] Foreign Application Priority Data

Apr. 14, 1988 [JP] Japan .................................. 63-92023

[51] Int. Cl.$^5$ ............................................. G11B 7/00
[52] U.S. Cl. .................................. 369/32; 369/44.32; 369/44.28
[58] Field of Search ............... 369/32, 44.27, 44.28, 369/44.29, 44.32, 44.34, 47, 44.31, 54

[56] References Cited

U.S. PATENT DOCUMENTS

| | | | |
|---|---|---|---|
| 4,716,557 | 12/1987 | Otani | 369/44.28 |
| 4,759,006 | 7/1988 | Koishi et al. | 369/44.28 |
| 4,825,137 | 4/1989 | Nakajima et al. | 369/44.28 |
| 5,033,041 | 7/1991 | Schroder | 369/44.78 |
| 5,046,058 | 9/1991 | Shimonou | 369/44.28 |
| 5,046,060 | 9/1991 | Chow et al. | 369/44.28 |
| 5,051,972 | 9/1991 | Yamamuro | 369/44.28 |
| 5,073,881 | 12/1991 | Akiyama | 369/44.32 |
| 5,088,075 | 2/1992 | Yokota | 369/44.28 |
| 5,089,999 | 2/1992 | Ishida et al. | 369/44.28 |
| 5,090,001 | 2/1992 | Ito et al. | 369/44.28 |

Primary Examiner—Andrew L. Sniezek
Assistant Examiner—Nabil Hindi
Attorney, Agent, or Firm—Stevens, Davis, Miller & Mosher

[57] ABSTRACT

In an apparatus in which information is reproduced by projecting/receiving an optical beam to/from a recording carrier having a large number of information tracks, tracking control is performed so as to maintain a reproducing position on an information track by supplying a track deviation signal to an actuator. If this track deviation signal becomes asymmetric by an inclination, etc. of the recording carrier so that a shock is applied to the apparatus, jumping out of a track occurs, resulting in slip-off of the optical beam from the reproducing position. This slip-off can be prevented by detecting a position of a movable support member carrying a focusing lens for projecting and receiving the optical beam and feeding back the position signal to the tracking control system, or by extracting a low-frequency component of an output signal of a control circuit and feeding back the extracted signal to the tracking control system.

8 Claims, 12 Drawing Sheets

SLIP-OFF PREVENTING TRACKING CONTROL APPARATUS

This is a continuation of application Ser. No. 07/337,156 filed Apr. 12, 1989. Now U.S. Pat. No. 5,109,366.

BACKGROUND OF THE INVENTION

1. Field of the Invention

The present invention relates to a tracking control apparatus for retrieving a particular selected information track out of a large number of information tracks disposed on a recording carrier and for recording signals onto the recording carrier or reproducing signals recorded on the recording carrier while performing tracking control so that the reproducing position of reproducing means may be located on the information track thus retrieved.

2. Description of the Related Art

A prior art apparatus, employs an optical reproducing apparatus for focusing and radiating an optical beam generated from a light source such as a semiconductor laser onto a disk shaped recording carrier rotated at a predetermined number of revolutions to thereby record signals onto the recording carrier or reproduce signals recorded on the recording carrier.

On this recording carrier, minute tracks each having a width of 0.6 micrometer and a pitch of 1.6 micrometer are disposed in a spiral form or in a concentrical form. When signals are recorded onto the recording carrier or signals recorded on the recording carrier are reproduced, tracking control is performed concurrently therewith so that an optical beam may be always located on a track. An error signal of this tracking control, i.e., a track slippage or slip off signal representing position deviation on the recording carrier between the optical beam and the track is derived by receiving, in an optical detector, reflected light or transmitted light from the recording carrier.

As an actuator for performing tracking control, there is known an actuator comprising a first actuator for moving a focusing lens to move the optical beam on the recording carrier in a track width direction and a second actuator for moving the first actuator in a radial direction of the recording carrier (as described in JP-A-57-147168, for example).

As the first actuator, an actuator so configured as to move the optical beam on the recording carrier in the track width direction by rotating a reflecting mirror is also known (as described in JP-A-56-153562, for example).

In the above described configuration using two actuators, a track deviation signal is applied to the first and second actuators, and tracking control is so performed that the optical beam on the recording carrier may be always located on a track. As for the relationship between the first and second actuators, the first actuator primarily moves for high speed track deviation and the second actuator primarily moves for low speed track deviation.

A large number of tracks are disposed on the recording carrier. Retrieving means is indispensable for retrieving a track having desired information recorded thereon.

Retrieval of a desired track is performed on the basis of addresses given to respective tracks on the recording carrier. The difference between the address of the track now being reproduced and the address of the desired track is derived, and tracking control is stopped. The second actuator is so driven that the optical beam on the recording carrier may cross as many tracks as correspond to the address difference. Thereafter, tracking control is activated again to retrieve the desired track (as described in JP-A-54-92155, for example).

In tracking control in the above described configuration comprising two actuators, movement of the optical beam on the recording carrier caused by the first actuator also moves an optical beam pattern on the optical detector for signal detection. Upon movement of the optical beam pattern on the optical detector, the track deviation signal is influenced, and the value of the track deviation signal with respect to the reference track position changes. When tracking control is activated, therefore, there occurs such a phenomenon that the optical beam on the recording carrier is not actually located on the center of a track even if track deviation appears to be absent judging from the track deviation signal. Further, movement of the focusing lens by the first actuator causes a swing of the optical beam radiated onto the recording carrier. Therefore, the quantity of radiated light is changed. As a result, the amplitude of the reproduced signal is changed or the quality of the recorded signal is degraded. In order to prevent this, the response performance of the second actuator must be improved.

On the other hand, the track deviation signal becomes a sinusoidal signal when the optical beam on the recording carrier crosses a track. However, it is very difficult to obtain a track deviation signal having a perfectly symmetric waveform. When the track deviation signal is asymmetric, crossing a track generates a DC-like component. If the response performance of the second actuator is enhanced and tracking control is not pulled in, the DC-like component of the track deviation signal is amplified and applied to the second actuator, and the optical beam on the recording carrier may slip off in a direction advancing from an outer circumference to an inner circumference or in its opposite direction. This phenomenon occurs when the tracking control is not pulled in at the time of retrieval, or when jumping out of a track is caused by a shock applied from the outside during activation of the tracking control. Occurrence of this phenomenon causes not only a long retrieval time but also a retrieval error, a reproduction error or a recording error, resulting in significantly lowered reliability of the apparatus.

Further, a configuration comprising a single actuator capable of performing the cracking control and the retrieval of a desired track and having a wide movable range is also known (as described in JP-A-60-239943, for example). In case of configuration in which the tracking control is performed by a single actuator, very high control precision of tracking control represented by a value not larger than 0.1 micrometer is required. At the rotation frequency of the recording carrier, therefore, the loop gain of the tracking control system must have a very high value close to 65 dB. If the tracking control is not pulled in when the loop gain of the tracking control is made high, a DC-like component of the track deviation signal is amplified and applied to an actuator, and slip-off similar to that described above occurs.

In case the dynamic range of a circuit for controlling and driving an actuator is asymmetric as well, a DC-like component causing slip-off is generated. That is to say, the actuator moves in a direction advancing from an inner circumference of the recording carrier to an outer circumference thereof in accordance with the eccentricity of tracks. If the maximum signal range of a circuit for moving the actuator in a direction advancing from an inner circumference to an outer circumference is different from the maximum signal range of a circuit for moving the actuator in a direction advancing from an outer circumference to an inner circumference, the signal is saturated and a DC-like component is generated when a track is crossed because the loop gain of the tracking control is very high. This DC-like component also causes a similar phenomenon.

SUMMARY OF THE INVENTION

An object of the present invention is to eliminate the above-described drawbacks of the prior art and provide an apparatus capable of performing stable tracking pulling-in without causing slip-off of the actuator when the tracking control is activated.

In order to achieve the above described objects, an apparatus according to the present invention comprises track deviation detecting means for detecting position deviation on the recording carrier between an optical beam and a track, moving means for moving the optical beam in the track deviation detecting means and for performing the moving means in accordance with a signal supplied from the track deviation detecting means and for performing control so as to always position the optical beam on the track, and slip-off preventing means for preventing slip-off caused in the tracking control operation.

Even if slip-off is generated in the tracking control operation in the above described configuration, the slip speed is lowered by the slip-off preventing means, pulling-in of tracking control being facilitated. Therefore, not only high speed retrieval but also prevention of occurrence of a retrieval error, a reproduction error or a recording error is attained. The reliability of the apparatus is significantly improved.

DESCRIPTION OF THE PREFERRED EMBODIMENTS

Figure 1:
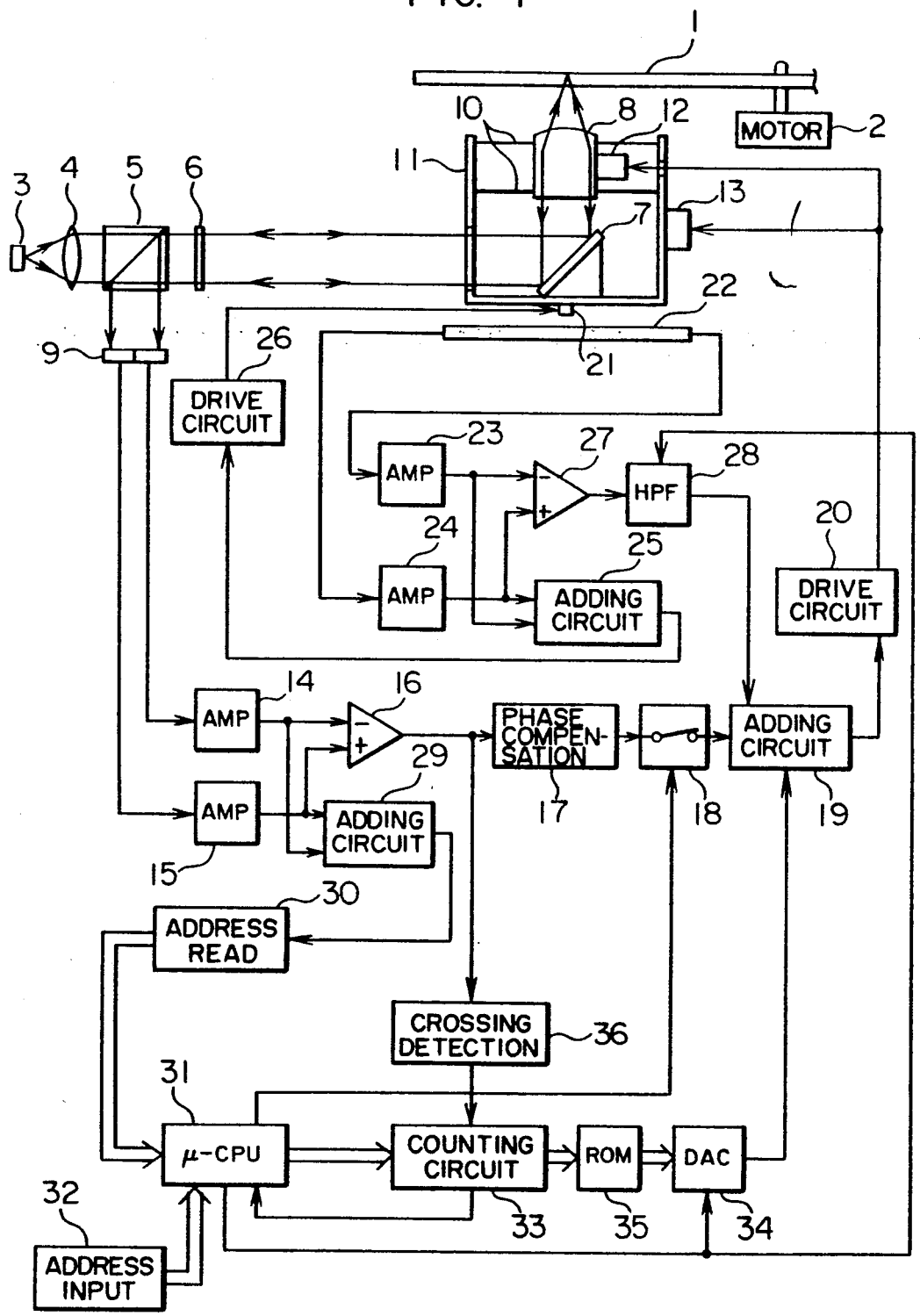
FIG. 1 is a block diagram showing the configuration of an embodiment of the present invention in which slip-off is prevented by feeding back a position signal to a tracking control system.

The present invention will now be described in detail by referring to the drawings. In the drawings, identical components are denoted by like numerals.

FIG. 1 is a block diagram showing the configuration of an embodiment of an optical reproducing apparatus performing tracking control by using a single actuator according to the present invention in which slip-off is prevented by applying a position signal of a movable member moved by the actuator to a tracking control system.

A disk-shaped recording carrier 1 is attached to a rotation shaft of a motor 2 and rotated with a predetermined number of revolutions.

On the recording carrier 1, spiral-shaped tracks each having a width of approximately 0.6 micrometer and a track pitch of approximately 1.6 micrometer and having signals recorded thereon are provided. An address signal for identifying a track position is recorded on each track beforehand.

An optical beam generated by a light source 3 such as semiconductor laser is collimated by a coupling lens 4 and then passed through a polarizing beam splitter 5 and a ¼ wavelength plate 6. The optical beam is then reflected by a total reflection mirror 7 and applied onto the recording carrier 1 by a focusing lens 8.

The reflected optical beam reflected by the recording carrier 1 is passed through the focusing lens 8, reflected by the total reflection mirror 7, and passed through the ¼ wavelength plate 6. The reflected light is then reflected by the polarizing beam splitter 5 and applied onto an optical detector 9.

The focusing lens 8 is attached to a frame 11 via flat spring 10. A coil (not illustrated) of a focus actuator is attached to the focusing lens 8. If a current is made to flow through this coil, the focusing lens 8 can move in a direction perpendicular to the face of the recording carrier 1 by an electromagnetic force applied to the coil. The focusing lens 8 is subject to focus control so that the optical beam may always be in a predetermined focusing state. Since the focus control is not directly related to the present invention, however, it will not be described further.

An actuator for tracking comprises a coil 12 attached to the focusing lens 8 and a permanent magnet (not illustrated) attached to a frame of the apparatus. When a current is made to flow through the coil 12, an electromagnetic force received by the coil 12 applies a force to the focusing lens 8 in the radius direction of the recording carrier 1, i.e., in the track width direction of the recording carrier 1. The flat spring 10 is so configured as to easily expand and contract in a direction perpendicular to the face of the recording carrier 1 and hardly expand and contract in the radius direction of the recording carrier 1. When the focusing lens 8 is moved by the force applied to the coil 12, therefore, the frame 11 receives a force via the flat spring 10 and moves in the radius direction of the recording carrier 1 as a result of the force.

The total reflection mirror 7 is attached to the frame so as to move in the radius direction of the recording carrier 1 in one body with the frame 11.

A coil 13 is attached to the frame 11. When a current is made to flow through the coil 13, the coil 13 receives a force in the radius direction of the recording carrier 1 as a result of interaction with a permanent magnet (not illustrated) attached to the apparatus frame. When the frame 11 moves in the radius direction of the recording carrier 1 as a result of the force applied to the coil 13, the focusing lens 8 receives a force via the flat spring 10 and moves in the radius direction of the recording carrier 1.

The coil 13 is an auxiliary component, and can be omitted when the weight of the frame 11 and the total reflection mirror 7 is small. In the embodiment of FIG. 1, therefore, it can be considered that the tracking control is essentially performed by one actuator.

An actuator so configured as to commonly use a permanent magnet in the coils 12 and 13 is described in JP-A-59-148153, for example.

The light source 3, the coupling lens 4, the polarizing beam splitter 5, the ¼ wavelength plate 6 and the optical detector 9 are fixed to the apparatus frame (not illustrated).

The optical detector 9 has a bisected structure. Outputs of sections are inputted to amplifiers 14 and 15, respectively. Output signals of the amplifiers 14 and 15 are supplied to a differential amplifier 16. The differential amplifier 16 outputs a signal depending upon the difference between both signals.

The output signal of the differential amplifier 16 is supplied to coils 12 and 13 via a phase compensating circuit 17 for compensating the phase of the tracking control system, a switch 18, an adding circuit 19 and a drive circuit 20 for performing power amplification. Therefore, the focusing lens 8 is driven in accordance with the output signal of the differential amplifier 16, and tracking control is performed so that the optical beam focused onto the recording carrier 1 may be always positioned on a track. A switch 18 is provided to make the tracking control nonactive.

Detection of the position of the frame 11 and prevention of slip-off performed by applying the position signal thus detected to the tracking control system in the tracking control operation will now be described.

A position detector for detecting the position of the frame 11 comprises a light source 21 attached to the frame 11 and an optical detector 22 attached to the apparatus frame. The optical detector 22 outputs two signals changing in accordance with the position of the light source 21 and having opposite polarities and a constant summation value. These two signals are amplified by amplifiers 23 and 24, respectively, and then inputted to an adding circuit 25. The adding circuit 25 outputs a signal depending upon the sum of the two signals. The signal thus outputted is transferred to the light source 21 via a drive circuit 26 for performing power amplification. Therefore, the light source 21 is so controlled that the sum of the optical currents of the optical detector 22 may be always constant. As a result, the influence of a change in light quantity of the light source 21 or a change in sensitivity of the optical detector 22 is reduced.

Further, output signals of the amplifiers 23 and 24 are inputted to a differential amplifier 27. The differential amplifier 27 outputs a signal depending upon the difference between the two output signals, i.e., a signal depending upon the position of the light source 21. The output signal of the differential amplifier 27 is transferred to the coils 12 and 13 via a high-pass filter 28 which does not pass low-frequency signals, the adding circuit 19 and the drive circuit 20. In the tracking control operation, therefore, the output signal of the differential amplifier 27 is supplied to the tracking control system to perform position control. Even if a shock is given to the apparatus and jumping out of a track is caused under the state that the output signal of the differential amplifier 16 contains a DC-like component, the frame 11 does not slip off in one direction because the position control is performed.

Retrieval of a desired track will now be described. The output signals of the amplifiers 14 and 15 are added together by an adding circuit 29. The resultant sum signal is transferred to an address read circuit 30. The address of a track on the recording carrier 1 whereat the optical beam is positioned is read by the address read circuit 30. The address thus read is sent to a micro-computer 31. When the address (NO) of a desired track is inputted to an address input unit 32, the address (N1) of a track on the recording carrier 1 whereat the optical beam is positioned is read and (NO−N1) is calculated by the microcomputer 31. On the basis of the value thus calculated, a value corresponding to the distance and the direction to the desired track is set in a counting circuit 33 by the microcomputer 31. Thereafter, the microcomputer 31 makes a D-A converter 34 ready, opens the switch 18 to make the tracking control nonactive, and make the output of the high-pass filter 28 equivalent to a predetermined value as described later in detail.

A ROM (read only memory) 35 outputs a value depending upon the output value of the counting circuit 33 and sends it to the D-A converter 34 for converting a digital signal into an analog signal. The output signal of the D-A converter 34 is applied to the coils 12 and 13 via the adding circuit 19 and the drive circuit 20. Therefore, the frame 11 moves toward the desired track. When the frame 11 moves, the differential amplifier 16 outputs a signal generated when the optical beam on the recording carrier 1 has crossed a track. A crossing detection circuit 36 compares the output signal of the differential amplifier 16 with a reference value to output a track crossing signal. The counting circuit 33 counts the output signal of the crossing detection circuit 36 and outputs a value depending upon the distance to the desired track every moment. The ROM 35 is provided for converting the output value of the counting circuit 33 into an ideal value to position the frame 11 at the described track at a high speed. Further, the adding circuit 19 is provided for adding together output signals of the switch 18, the high-pass filter 28 and the D-A converter 34.

The counting circuit 33 detects the fact that two optical beam on the recording carrier 1 has reached the track and sends a signal indicating the fact to the microcomputer 31. The microcomputer 31 stops the output of the D-A converter 34. At the same time, the micro-computer 31 makes the high-pass filter 28 active and closes the switch 18 to make the tracking control active. Thereafter, the address is read again. When the address thus read coincides with the address of the desired track, the retrieval is finished. In case of noncoincidence, the above described retrieval operation is repeated to retrieve the desired track.

Figure 2:
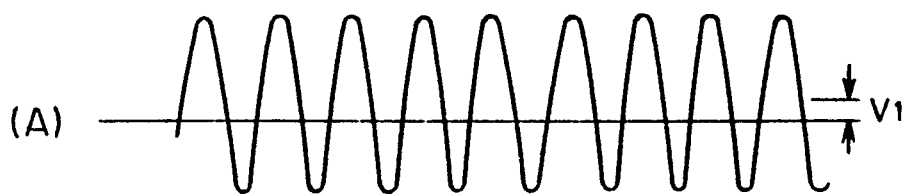
FIGS. 2(A) and 2(B) are waveform diagrams showing a slip-off generating signal contained in a track deviation signal.

Generation of a DC-like (direct current like) signal component in the output signal of the differential amplifier 16 caused when the optical beam on the recording carrier 1 has crossed a track will now be described by referring to FIG. 2 as well.

FIG. 2(A) shows the output signal of the differential amplifier 16 generated when the optical beam on the recording carrier has crossed a large number of tracks under the condition that the tracking control is not active. Although the track deviation signal is approximately sinusoidal as illustrated, it is asymmetric with respect to the reference level. Asymmetry of the track deviation signal is caused by an inclination of the recording carrier 1 or asymmetry of an irregularity signal or a groove forming a track on the recording carrier 1, for example. If such a track deviation signal is passed through a low-pass filter having a passband sufficiently lower than the frequency of crossing, a DC-like component V1 is generated as shown in FIG. 2(B).

A DC-like signal component generated when the dynamic range of a circuit for controlling and driving the actuator is asymmetric will now be described by referring to FIG. 3 as well.

Figure 3:
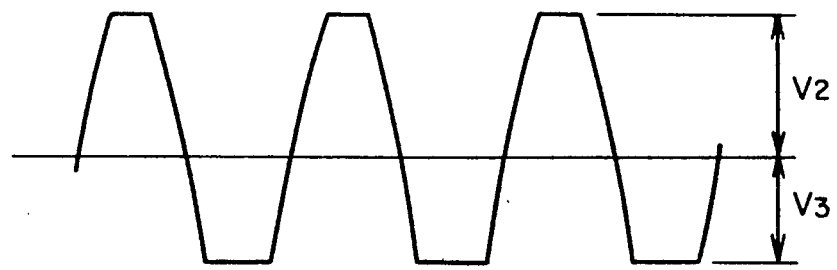
FIG. 3 is a waveform diagram showing a slip-off generating signal caused by a dynamic range difference of a control circuit.

FIG. 3 shows the output signal of the drive circuit 20 generated when the optical beam on the recording carrier has crossed a large number of tracks under the condition that the tracking control is active. As illustrated, the dynamic range of the drive signal is asymmetric with respect to the reference level. Assuming that the maximum signal range in a movement from an inner circumference to an outer circumference is V2 and the maximum signal range in a movement from an outer circumference to an inner circumference is V3, the relation V2 > V3 holds. Asymmetry is thus caused by the circuit configuration. In general, however, it is very difficult to satisfy specifications of performance such as temperature characteristics or frequency characteristics and obtain symmetry. When the dynamic range of the signal is thus asymmetric, it is a matter of course that a DC-like component is generated. The case where the dynamic range of the drive circuit is asymmetric has been described. However, it does not necessarily follow that a DC-like component is generated only by the drive circuit 20. If the drive circuit 20 has a low gain (amplification factor) and the drive circuit 20 is so configured that the output signal may not be saturated with respect to the input signal, for example, a DC-like component is generated by asymmetry of the dynamic range of the output signal of the adding circuit 19. In the same way, a circuit such as the switch 18, the phase compensating circuit 17 or the differential amplifier 16 may produce a DC-like component.

When the above described DC-like component is large, slip-off is caused. If jumping of a track is caused by a shock applied to the apparatus, for example, the optical beam on the recording carrier 1 crosses a track. Therefore, the DC-like current flows through the coils 12 and 13, and hence the frame 11 receives a force in the radius direction of the recording carrier 1. When the optical beam on the recording carrier 1 crosses a track at such a speed as to exceed the control band of the tracking control as a result of the force, the frame 11 slips off in a direction advancing from an outer circumference to an inner circumference or in its opposite direction.

Even if the described track is sensed at the time of retreival and the tracking control is activated, the optical beam is not pulled into the track in some cases. In such a case as well, slip-off is caused in the same way. Since the output signal of the differential amplifier 27 is supplied to the coils 12 and 13 to perform position control in the embodiment of FIG. 1, the frame 11 does not slip off.

Figure 4:
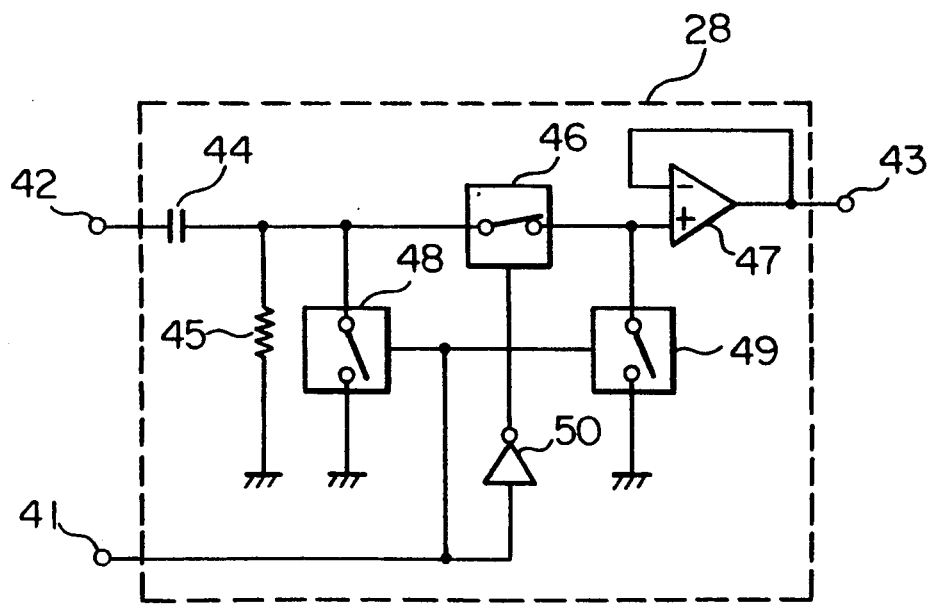
FIG. 4 is a block diagram showing the configuration of a high-pass filter (HPF) 28.

FIG. 4 is a block diagram showing a concrete configuration of the high-pass filter 28.

The relationship between FIG. 1 and FIG. 4 will now be described. An input terminal 41 is supplied with an operation command signal of tracking control generated by the microcomputer 31. An input terminal 42 is supplied with the output signal of the differential amplifier 27. An output terminal 43 is connected to the adding circuit 19. A capacitor 44 and a resistor 45 are provided to cut off the DC component of the signal supplied to the input terminal 42, i.e., the output signal of the differential amplifier 27. The signal with the DC component cut off is supplied to a non-inverting input terminal of an operational amplifier 47 via a switch 46. The signal at the input terminal 41 is supplied to a gate input terminal for controlling the opening/closing of switches 48 and 49 and to an inverting circuit 50 for inverting the polarity of the input signal. Further, the output signal of the inverting circuit 50 is supplied to a gate input terminal of the switch 46. Each of the switches 46, 48 and 49 is so configured as to be short-circuited when its gate input terminal is at a high state. The operation command signal of tracking control supplied to the input terminal 41 assumes a low state when tracking control is to be active. When the tracking control is active, therefore, the switch 46 is in the short-circuit state, and the switches 48 and 49 are in the open state. When the tracking control is nonactive, the switch 46 is in the open state, and the switches 48 and 49 are in the short-circuit state. The input impedance and the open-loop gain of the operational amplifier 47 are very large. Since the output terminal of the operational amplifier 47 is connected to the inverting input terminal thereof, the operational amplifier 47 functions as an amplifier having a gain of unity. In the active state of tracking control, therefore, a high frequency component signal included in the signal supplied to the input terminal 42 is supplied to the output terminal 43 and then applied to the tracking control system.

One end of the switch 49 is connected to a reference voltage source (GND in case of FIG. 4). When the tracking control is nonactive, therefore, the non-inverting input terminal of the operational amplifier 47 assumes a reference level of the reference voltage source (i.e., GND level in FIG. 4). As a result, the output of the operational amplifier 47 also assumes the reference level.

The reason that the output of the operational amplifier 47 is fixed to the reference level at the time of retrieval will now be described. If the signal of the differential amplifier 27 shown in FIG. 1 is applied to the tracking control system, the frame 11 undergoes position control so that its position may be maintained. Even if such a signal as to move the frame 11 toward the desired track is outputted from the D-A converter 34, therefore, this signal tends to be canceled. In order to achieve stable retrieval, the output of the operational amplifier 47 is fixed to the reference level.

The reason that the low-frequency component of the output signal of the differential amplifier 27 is cut off by the capacitor 44 and the resistor 45 will now be described. The differential amplifier 27 outputs a signal corresponding to the position of the light source 21. If this signal is applied as it is, therefore, the focusing lens 8 and the frame 11 are positioned by this position control. For positioning the focusing lens 8 and the frame 11 by tracking control, the DC component of the output signal of the differential amplifier 27 must be removed. The present invention makes it possible to remove the DC component of the output signal of the differential amplifier 27 by using a simple configuration and, in addition, to prevent track deviation caused by a temperature change of the differential amplifier 27.

The reason that the switch 48 is provided will now be described. If the frame 11 moves at the time of retrieval, the position signal is supplied to the input terminal 42. Unless the switch 48 is present, a signal is generated at a junction point of the capacitor 44 and the resistor 45. When the optical beam comes to the desired track and the tracking control is activated, the signal thus generated functions to return the frame 11 to the original position, resulting in very unstable retrieval. In order to prevent this, the switch 48 is short-circuited at the time of retrieval so that a signal may not be generated at the junction point between the capacitor 44 and the resistor 45.

The switch 46 may be omitted. When a semiconductor analog switch is used as the switch 48, the switch 48 has resistance to some degree even if the switch 48 is closed. Therefore, the potential at the junction point between the capacitor 44 and the resistor 45 does not perfectly become the reference level, and a minute signal is generated at the junction point. The switch 46 is so provided that this minute signal may not be applied to the tracking control system.

The switch 49 is provided for making the output of the operational amplifier 47 equivalent to the reference level when the switch 46 is in the open state.

As heretofore described, a signal obtained by processing the position signal of the frame 11 is applied to the tracking control system. Even if jumping out of a track is caused, therefore, the frame 11 does not slip off. Further, the position signal of the frame 11 is not applied to the tracking control system, and hence retrieval of a desired track can be performed at a high speed and with stability.

As the signal for controlling the operation of the high-pass filter 28 in the embodiment of FIG. 1, the operation command signal of tracking control inputted to the gate input terminal of the switch 18 can be used in common. That is to say, the apparatus can be so configured that the operation of the high-pass filter 28 may be controlled by a signal obtained by inverting the polarity of the operation command signal of tracking control.

If the apparatus is so configured that the position of the frame 11 may be detected by using a position detector only slightly changing with temperature and position control may be performed by using the difference between the output signal of this position detector and a reference position signal depending upon the position of the frame 11, the capacitor 44, the resistor 45 and the switch 48 can be omitted.

When the tracking control is active in the embodiment of FIG. 1, the position signal of the frame 11 is supplied to the tracking control system. If the feedback quantity of this position signal is small, however, the effect of preventing the slip-off is slight. If, on the other hand, the feedback quantity of the position signal is increased, the effect of preventing the slip-off is increased, but the gain of the tracking control system in the low-frequency region is lowered, and the control precision is degraded.

Figure 5:
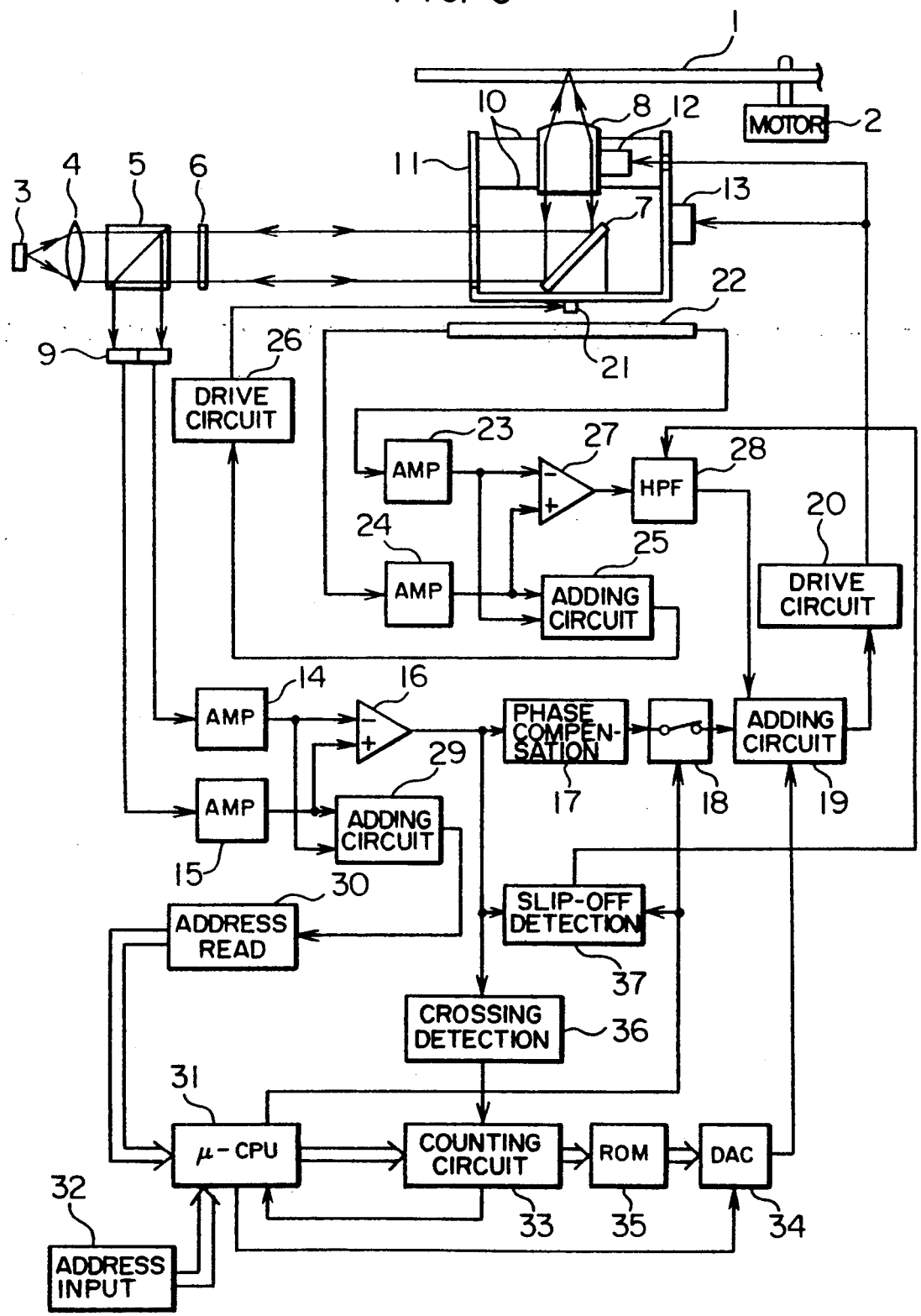
FIG. 5 is a block diagram showing the configuration of an embodiment of the present invention in which slip-off is prevented by providing a slip-off detecting circuit 37 and by feeding back a position signal to a tracking control system when slip-off is generated.

FIG. 5 is a block diagram of an embodiment in which the position signal of the frame 11 is applied to the tracking control system only when slip-off occurs and the effect of slip-off prevention can be enhanced.

A slip-off detecting circuit 37 is supplied with the output signal of the differential amplifier 16 and the operation command signal of tracking control generated by the microcomputer 31.

When slip-off occurs in the tracking control operation, the slip-off detecting circuit 37 detects occurrence of the slip-off from the output signal of the differential amplifier 16 and sends a signal to the high-pass filter 28. Upon appearance of the output signal of the slip-off detecting circuit 37, the high-pass filter 28 starts its operation, processes the output signal of the differential amplifier 27, and sends it to the adding circuit 19.

Only when slip-off is caused, therefore, the position signal of the frame 11 is supplied to the tracking control system. In a normal tracking control operation, the gain of the low-frequency region is not lowered.

The configuration of the slip-off detecting circuit 37 will now be described by referring to a block diagram of FIG. 6 as well. The relationship between FIG. 5 and FIG. 6 will first be described. An input terminal 61 is supplied with the operation command signal of tracking control transmitted from the microcomputer 31. An input terminal 62 is supplied with the output signal of the differential amplifier 16. An output terminal 63 is connected to the high-pass filter 28, i.e., the input terminal 41 of FIG. 4.

A comparator 64 compares the output signal of the differential amplifier 16 with a predetermined comparison level which is positive with respect to the reference level. The comparator 64 sends a signal, which is at a high level when the output signal of the differential amplifier 16 is higher than the comparison level, to an interval measuring circuit 65. The interval measuring circuit 65 is supplied with the output signal of an oscillator 66 for generating a signal of a predetermined frequency. The interval measuring circuit 65 measures the high level interval of the comparator 64 by counting the output signal of the oscillator 66. When the high level interval is longer than a predetermined interval, the interval measuring circuit 65 sends a pulse signal to a retriggerable monostable multivibrator 67 (hereafter referred to as a monostable multivibrator). In response to the pulse signal of the interval measuring circuit 65, the monostable multivibrator 67 outputs a signal which assumes the high level for a predetermined interval. The monostable multivibrator 67 is so configured as to maintain the high level when the pulse signal is transmitted from the interval measuring circuit 65 while the monostable multivibrator 67 is outputting the high level signal. Further, the monostable multivibrator 67 is supplied with the operation command signal of tracking control. The monostable multivibrator 67 is so configured as to be nonactive when the tracking control is nonactive.

The operation of the slip-off detecting circuit 37 shown in FIG. 6 will now be described by referring to a timing chart of FIG. 7. In FIG. 7, waveform (A) represents the output signal of the differential amplifier 16, and waveform (B) represents the output signal of the comparator. Waveform (C) represents the operation command signal of tracking control supplied to the input terminal 61, and waveform (D) represents the output signal of the interval measuring circuit 65, whereas waveform (E) represents the output signal of the monostable multivibrator 67. As shown in the waveform (C), the input terminal 61 is supplied with a signal which is at a high level when the tracking control is active and which is at a low level when the tracking control is nonactive. Even if a pulse signal is sent from the interval measuring circuit 65 to the monostable multivibrator 67 when the input terminal 61 is at a low level, the output of the monostable multivibrator 67 is kept at a low level. There are dust and flaws on the surface of the recording carrier 1. Further, there are dropouts on the recording carrier surface. In this case, a disturbance 68 occurs in the output signal of the differential amplifier 16, and hence a pulse signal 69 is generated in the output of the comparator 64. When the duration of the pulse 69 is shorter than the detection width of the interval measuring circuit 65, however, the interval measuring circuit 65 does not generate a pulse signal. Therefore, a false operation caused by dropouts or the like can be prevented. Assuming that the highest speed of slip-off occurrence, i.e., the highest frequency of track crossing performed by the optical beam on the recording carrier 1 is $f_o$ (Hz), the detection width of the interval measuring circuit 65 must be so set as not to exceed $1/(2 \times f_o)$ sec.

If pulse signals are consecutively inputted to the monostable multivibrator 67 in the state that tracking control is active, the monostable multivibrator 67 is kept at the high level as shown in the waveform (E) and changes to its low level when t1 has elapsed since the last input pulse 70. The time t1 is the duration of the high level signal outputted by the monostable multivibrator 67 in response to one input pulse. Assuming that the control band of tracking control is $f_1$ Hz, it is desirable that t1 does not exceed $1/f_1$ sec.

Figure 6:
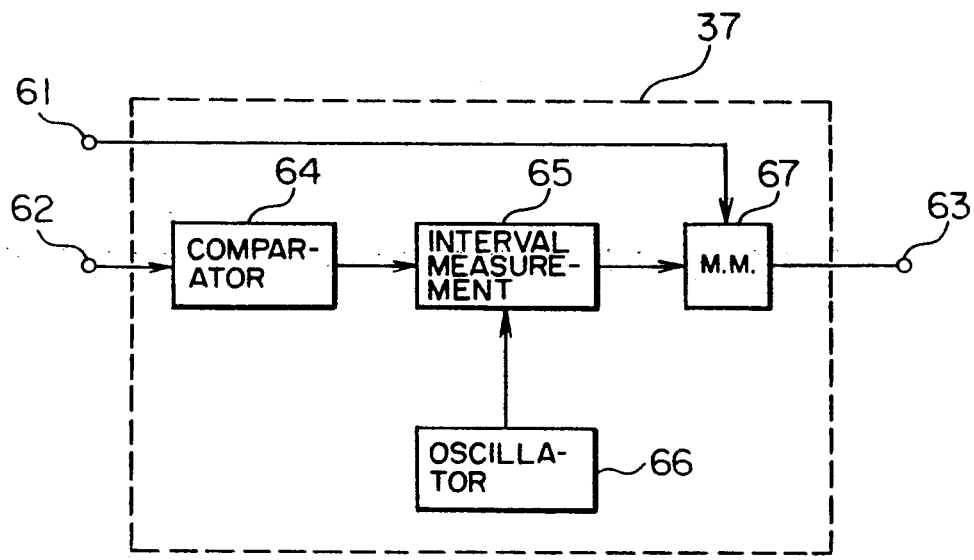
FIG. 6 is a block diagram showing the configuration of the slip-off detecting circuit 37.
Figure 7:
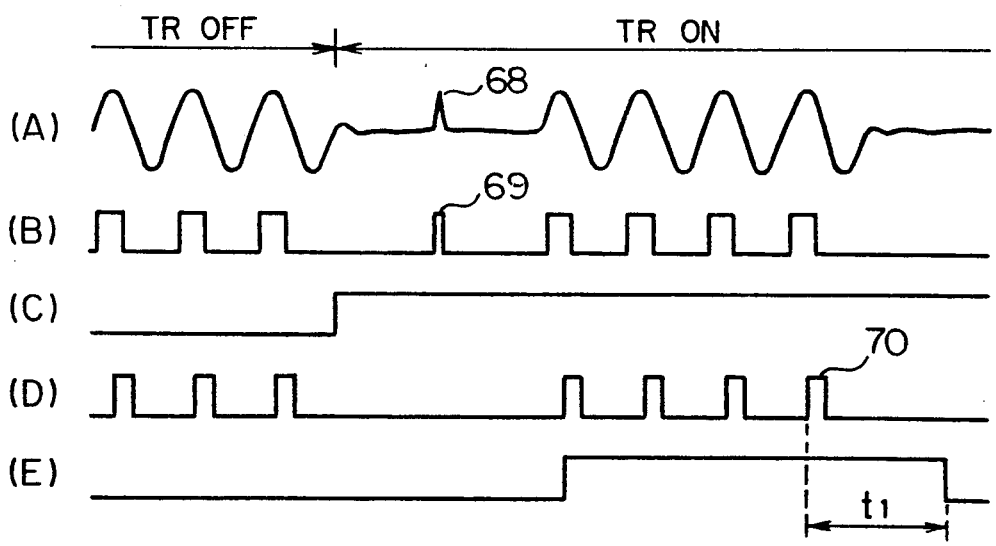
FIGS. 7(A)-7(E) is a timing chart used for explaining the operation of the slip-off detecting circuit 37 shown in FIG. 6.

In FIG. 6, the comparator 64 has a positive comparison level. Even if a negative comparison level is used, however, there is no problem.

Figure 8:
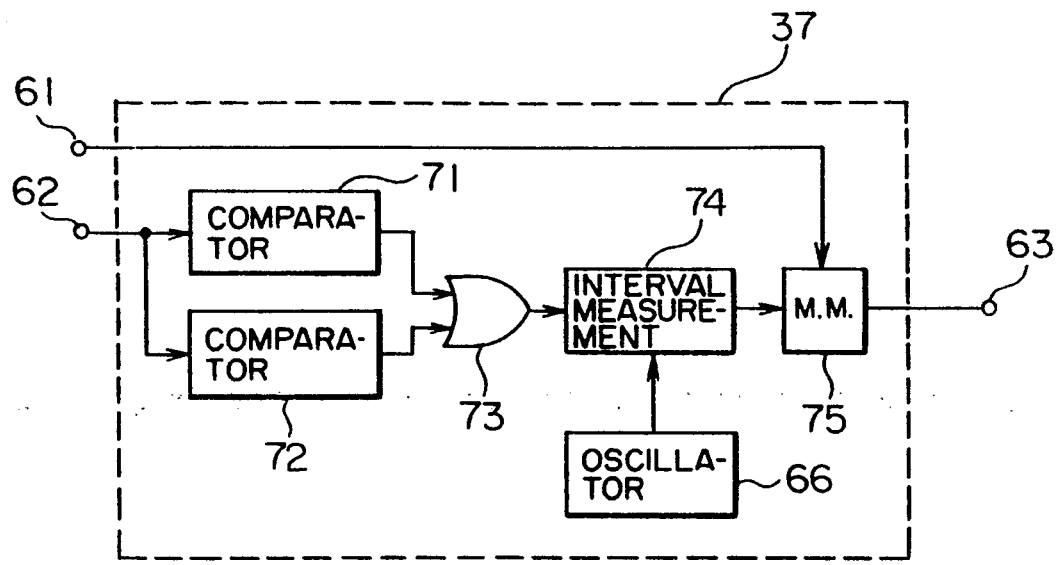
FIG. 8 is a block diagram showing another configuration of the slip-off detecting circuit 37.

Further, the slip-off detecting circuit 37 can be configured as shown in FIG. 8.

Numeral 71 denotes a comparator having a positive predetermined comparison level. When the output signal of the differential amplifier 16 has a level higher than the comparison level, the comparator 71 outputs a high level signal. Numeral 72 denotes a comparator having a negative predetermined comparison level. When the output signal of the differential amplifier 16 has a level lower than the comparison level, the comparator 72 outputs a high level signal. Output signals of the comparators 71 and 72 are supplied to an OR circuit 73. The OR circuit 73 sends a signal corresponding to the logical sum of the output signals of the comparators 71 and 72 to the interval measuring circuit 74. The interval measuring circuit 74 measures the high level interval of the OR circuit 73 by counting the output signal of the oscillator 66. If the high level interval is longer than a predetermined interval, the interval measuring circuit 74 transmits a pulse signal to a retriggerable monostable multivibrator 75. The monostable multivibrator 75 is responsive to the output signal of the interval measuring circuit 74 and outputs a high level signal for a predetermined interval. The monostable multivibrator 75 is so configured as to maintain the high level at its output, provided that a pulse signal is transmitted thereto from the interval measuring circuit 74 while the monostable multivibrator 75 is outputting the high level signal. Further, the monostable multivibrator 75 is supplied with the operation command signal of tracking control, and configured so as not to operate when the tracking control is not activated.

Figure 9:
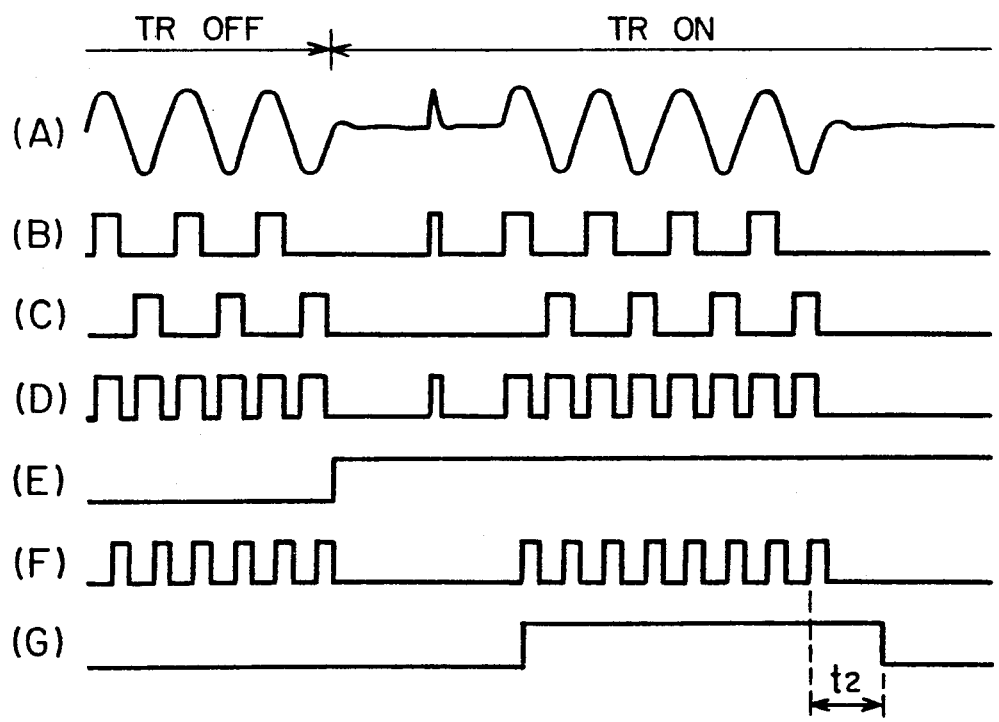
FIGS. 9(A)-9(G) is a timing chart used for explaining the operation of the slip-off detecting circuit 37 shown in FIG. 8.

The operation of the slip-off detecting circuit 37 shown in FIG. 8 will now be described by referring to a timing chart of FIG. 9 as well. In FIG. 9, waveform (A) represents the output signal of the differential amplifier 17, and waveform (B) represents the output signal of the comparator 71. Waveform (C) represents the output signal of the comparator 72, and waveform (D) represents the output signal of the OR circuit 73. Waveform (E) represents the operation command signal of tracking control supplied to the input terminal 61, and waveform (F) represents the output signal of the interval measuring circuit 74, whereas waveform (G) represents the output signal of the monostable multivibrator 75. The time $t_2$ is the duration of the high level signal outputted by the monostable multivibrator 75 in response to one input pulse. Assuming that the control band of tracking control is f1 Hz, it is desirable that t2 does not exceed $\frac{1}{4}$ f1 sec.

The configuration of the slip-off detecting circuit 37 shown in FIG. 8 has the following two merits as compared with the configuration of FIG. 6. Firstly, t2 can be made short, and hence the duration of slip-off can be detected more accurately. Secondly, the output signal of the differential amplifier 16 starts from a positive value or a negative value with respect to the reference level in accordance with the direction of slip-off when the slip-off begins. Since both the positive value and the negative value are detected, however, there is no difference caused by the direction of slip-off, resulting in more accurate detection.

In the embodiment of FIG. 5, slip-off is detected from the output signal of the differential amplifier. However, slip-off may be detected by reading the address. In this case, the microcomputer 31 always reads the address in the tracking control operation, and compares the address currently read with the address previously read. When an address difference is caused, the microcomputer 31 considers that slip-off has occurred and activates the high-pass filter 28.

In the embodiment of FIG. 5 heretofore described, a signal obtained by processing the position signal of the frame 11 is not applied to the tracking control system, when the tracking control is activated. Therefore, the gain of the tracking control in the low-frequency region is not lowered. Accordingly, the feedback quantity of the position signal of the frame 11 can be made large. Even if the symmetry of the track deviation signal is very bad, therefore, slip-off of the frame 11 can be prevented.

Figure 10:
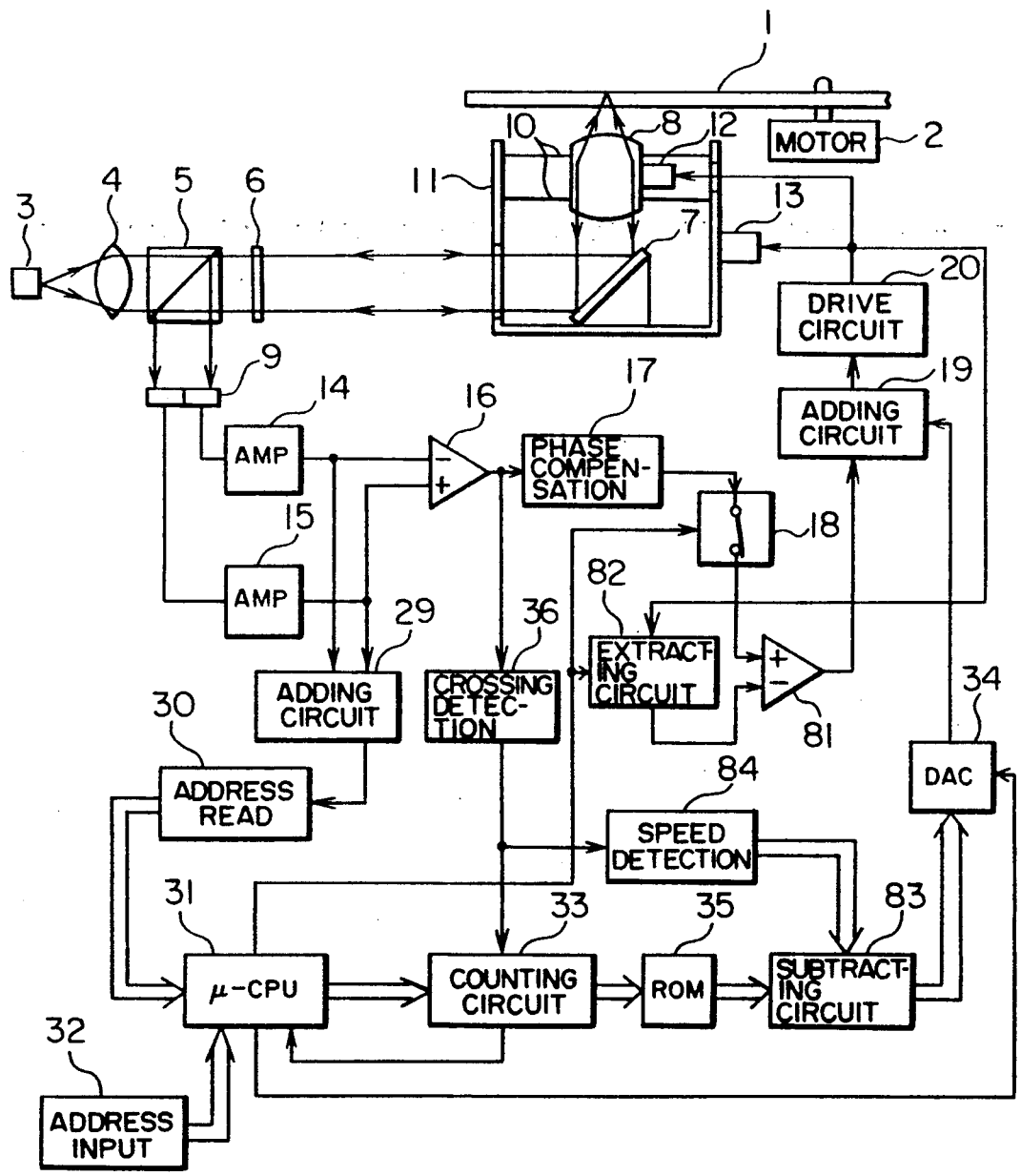
FIG. 10 is a block diagram showing the configuration of an embodiment of the present invention in which slip-off is prevented by providing an extracting circuit 82 and by feeding back a signal of a low frequency component extracted by the extracting circuit 82 to a tracking control system.

FIG. 10 is a block diagram of an embodiment in which slip-off is prevented without detecting the position of the frame 11. The apparatus of FIG. 10 is so configured that the low-frequency component of the control circuit may be extracted in the tracking control operation and applied to the control circuit to prevent slip-off of tracking control.

The output signal of the differential amplifier 16 is supplied to the coils 12 and 13 via the phase compensating circuit 17, the switch 18, a differential amplifier 81, the adding circuit 19 and the drive circuit 20.

Extracting the low frequency component of the control circuit in the tracking control operation and applying this signal to the control circuit to prevent slip-off of the tracking control will now be described. The extracting circuit 82 extracts the low-frequency component from the output signal of the drive circuit 20 and transmits the extracted signal to the differential amplifier 81. The differential amplifier 81 outputs a signal corresponding to the difference between the output signal of the switch 18 and the output signal of the extracting circuit 82. Even if slip-off occurs in the tracking control operation and a DC-like component is generated in the output signal of the drive circuit 20, therefore, the frame 11 does not slip off because the DC-like component is reduced by the differential amplifier.

Retrieval of a desired track will now be described briefly. When the address (N0) of a desired track is inputted from the address input unit 32, the microcomputer 31 reads the address (N1) of a track whereon the optical beam on the recording carrier 1 is positioned and calculates (N0-N1). Thereafter, the microcomputer 31 sets a value depending upon the distance and the direction to the desired track in the counting circuit 33, and makes the D-A converter 34 ready to operate. In addition, the microcomputer 31 opens the switch 18 to inactivate the tracking control and inactivates the extracting circuit 82 as described later in detail.

The ROM 35 outputs a value depending upon the output value of the counting circuit 33 and sends it to a subtracting circuit 83. The subtracting circuit 83 sends a signal to the D-A converter 34. The output signal of the D-A converter 34 is supplied to the coils 12 and 13 via the adding circuit 19 and the drive circuit 20. If the frame 11 moves, the counting circuit 33 counts the output signal of the crossing detection circuit 36, and outputs a value corresponding to the distance to the desired track every moment. A speed detecting circuit 84 detects the moving speed of the optical beam on the recording carrier 1 by measuring the period of the output signal of the crossing detection circuit 36 and sends the detected value to the subtracting circuit 83. The subtracting circuit 83 calculates the difference between the output value of the ROM 35 and the output value of the speed detecting circuit 84 and sends the difference to the D-A converter 34.

The counting circuit 33 detects the fact that the optical beam on the recording carrier 1 has reached a track and sends a signal indicating the fact to the microcomputer 31. The microcomputer 31 stops the operation of the D-A converter 34. At the same time, the microcomputer 31 activates the extracting circuit 82 and short-circuits the switch 18 to activate the tracking control. Thereafter, the microcomputer 31 reads an address again, and terminates the retrieval provided that the address thus read agrees to the address of the desired track. In case of disagreement, the microcomputer 31 repeats the above described retrieval operation to retrieve the desired track.

The configuration of the extracting circuit 82 will now be described by also referring to a configuration diagram shown in FIG. 11. The relationship between FIG. 10 and FIG. 11 will first be described. An input terminal 91 is supplied with the operation command signal of tracking control generated by the microcomputer 31, whereas an input terminal 92 is supplied with the output signal of the drive circuit 20. The output signal at an output terminal 93 is supplied to the differential amplifier 81. The output signal of the drive circuit 20 is inputted to one end of a resistor 95 via a switch 94. The resistor 95 and a capacitor 96 constitute a low-pass filter. At a junction point between the resistor 95 and the capacitor 96, therefore, the low-frequency component of the output signal of the drive circuit 20 is extracted. The signal thus extracted is supplied to a non-inverting input terminal of an operational amplifier 98 via a switch 97. The input impedance and open loop gain of the operational amplifier 98 are very large. Since the output terminal of the operational amplifier 98 is connected to the non-inverting input terminal thereof, the operational amplifier 98 serves as an amplifier having a gain of unity. The output signal of the operational amplifier 98 is supplied to the differential amplifier 81 shown in FIG. 10 via an amplifier 99.

The non-inverting input terminal of the operational amplifier 98 is connected to the reference voltage source (GND in FIG. 11) via a switch 100. The signal at the input terminal 91 is supplied to gate input terminals of the switches 94 and 97 for controlling the opening/closing operation. The signal at the input terminal 91 is also transferred to a gate input terminal of a switch 100 via an inverting circuit 101 for inverting the polarity. Under the nonactive state of tracking control, therefore, the switches 94 and 97 are in an open state, and the switch 100 is in a short-circuit state. As a result, the output of the operational amplifier 98 assumes the reference level (GND level in FIG. 11) of the reference voltage source.

The switch 94 prevents the drive signal outputted to the drive circuit 20 at the time of retrieval from being applied to the low-pass filter comprising the resistor 95 and the capacitor 96. Even if the switch 94 is opened, it takes a time for a signal extracted at the junction point between the resistor 95 and the capacitor 96 to decay. If this signal is supplied to the coils 12 and 13 in FIG. 10, there is a possibility that retrieval might become unstable. The switch 97 is provided for preventing this. The switches 100 is provided to make the output of the operational amplifier 98 equivalent to the reference level when the switch 97 enters an open state.

In the embodiment of FIG. 10, the low frequency component of the drive circuit 20 is fed back. At the low-frequency region of the tracking control system, therefore, the loop gain is lowered. Assuming that, in the low-frequency region, the gain measured from the inverting input terminal of the differential amplifier 81 to the output terminal of the drive circuit 20 is G1 and the gain of the extracting circuit 82 is G2, the gain of the tracking control system in the low-frequency region is lowered by $$G1/(1+G1\times G2).$$

Assuming that G1=1 and G2=3, for example, the loop gain of the tracking control system in the low-frequency region is lowered by approximately 12 dB. The tracking control needs a loop gain at the rotation frequency of the recording carrier 1. Therefore, it is desirable that the time constant of the resistor 95 and the capacitor 96 is so set that the rotation frequency component of the recording carrier 1 may be attenuated. By doing so, the loop gain at the rotation frequency of the recording carrier 1 is scarcely lowered even if the DC-like component is reduced by 12 dB at the output of the drive circuit 20.

In the embodiment of FIG. 10 heretofore described, the DC-like component at the output of the drive circuit 20 is reduced, and hence the moving speed of the frame 11 is lowered. Therefore, pulling-in of the tracking control is facilitated, and the slip-off of the frame 11 can be prevented.

If the dynamic range of the output signal of the drive circuit 20 is symmetric, the apparatus of FIG. 10 may be so configured that the output signal of the adding circuit 19 may be supplied to the extracting circuit 82. In this case, the switch 94 of the extracting circuit 82 shown in FIG. 11 can be omitted.

Figure 11:
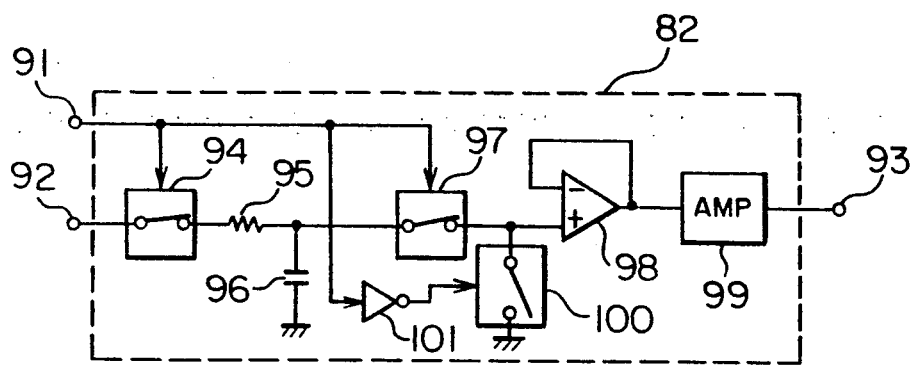
FIG. 11 is a block diagram showing the configuration of the extracting circuit 82.

In the configuration of the extracting circuit 82 shown in FIG. 11, the loop gain of the tracking control in the low-frequency region is lowered, and the control precision of the tracking control is degraded due to friction or the like.

Figure 12:
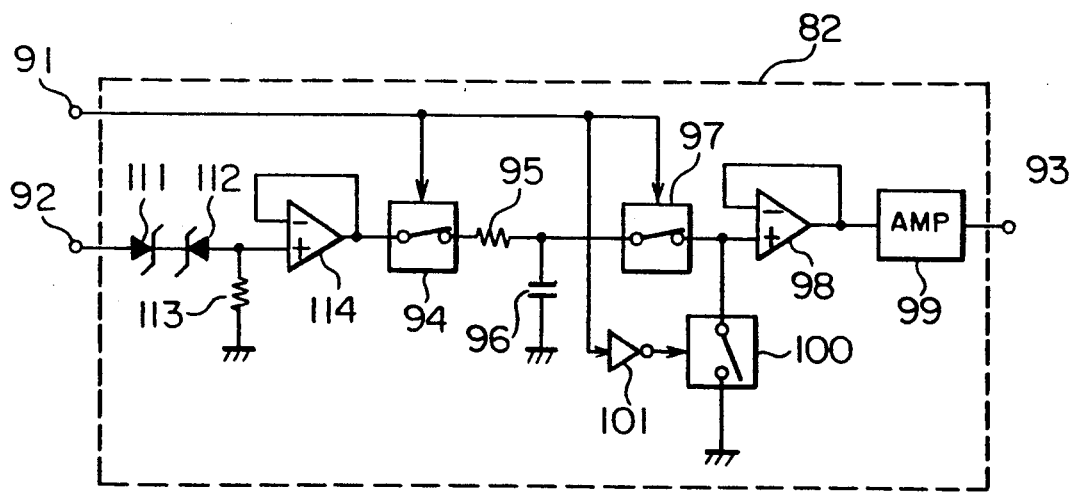
FIG. 12 is a block diagram showing another configuration of the extracting circuit 82.

If the extracting circuit 82 is configured as shown in FIG. 12, the lowering of the loop gain of the tracking control in the low-frequency region can be prevented. With reference to FIG. 12, Zener diodes 111 and 112 for passing signals exceeding a predetermined value are so connected in series as to oppose each other. The other terminal of the Zener diode 111 is connected to an input terminal 92, and the other terminal of the Zener diode 112 is connected to one terminal of a resistor 113. The other terminal of the resistor 113 is connected to a reference voltage source. The junction point between the Zener diode 112 and the resistor 113 is connected to a non-inverting input terminal of an operational amplifier 114. The operational amplifier 114 has an output terminal connected to an inverting input terminal thereof. When a signal is inputted at the input terminal 92, therefore, a signal exceeding the Zener voltage of the Zener diodes 111 and 112 (or more precisely, a signal exceeding the Zener voltage plus the forward voltage) is outputted at the output terminal of the operational amplifier 114. In a normal tracking control operation, the signal inputted at the input terminal 92 is small, and hence the operational operational amplifier 114 does not output any signal. Therefore, the loop gain of the tracking control in the low-frequency region is not lowered. If slip-off occurs, a large signal exceeding the Zener voltage is inputted at the input terminal 92. Therefore, a low frequency component extracted from the output signal of the operational amplifier 114 is outputted at an output terminal 93, and hence slip-off can be prevented. Since the low-frequency component is not fed back to the control circuit in a normal tracking control operation, the value of G2 can be made large so as to sufficiently reduce the DC-like component.

Figure 13:
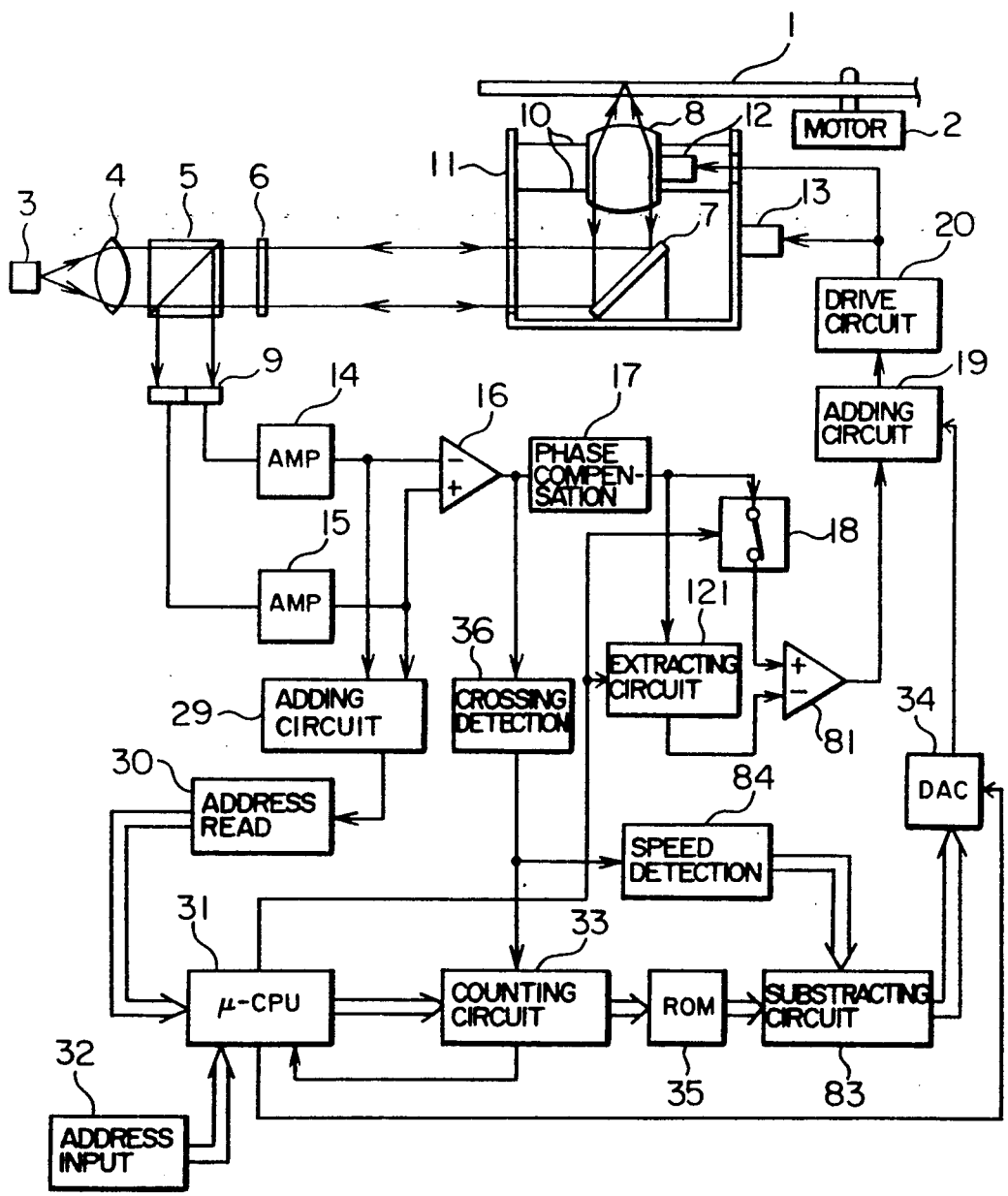
FIG. 13 is a block diagram showing the configuration of an embodiment of the present invention in which slip-off is prevented by providing an extracting circuit 121 and by feeding back a signal of a low frequency component extracted from a track deviation signal by the extracting circuit 121 to tracking control system.

FIG. 13 is a block diagram of an embodiment so configured that the output signal of the phase compensating circuit 17 may be supplied to an extracting circuit 121. The extracting circuit 121 extracts a low frequency component from the output signal of the phase compensating circuit 17 and sends the extracted signal to the differential amplifier 81. Therefore, a DC-like component caused by asymmetry of the track deviation signal or the dynamic range of the phase compensating circuit 17 is reduced. As a result, slip-off of the frame 11 can be prevented. The configuration of FIG. 13 is effective when dynamic ranges of output signals of the differential amplifier 81, the adding circuit 19 and the drive circuit 20 are symmetric.

Figure 14:
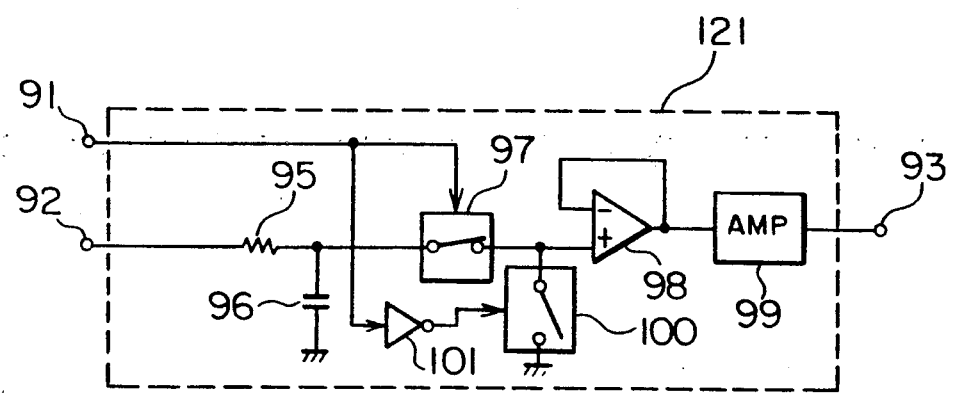
FIG. 14 is a block diagram showing the configuration of the extracting circuit 121.
Figure 15:
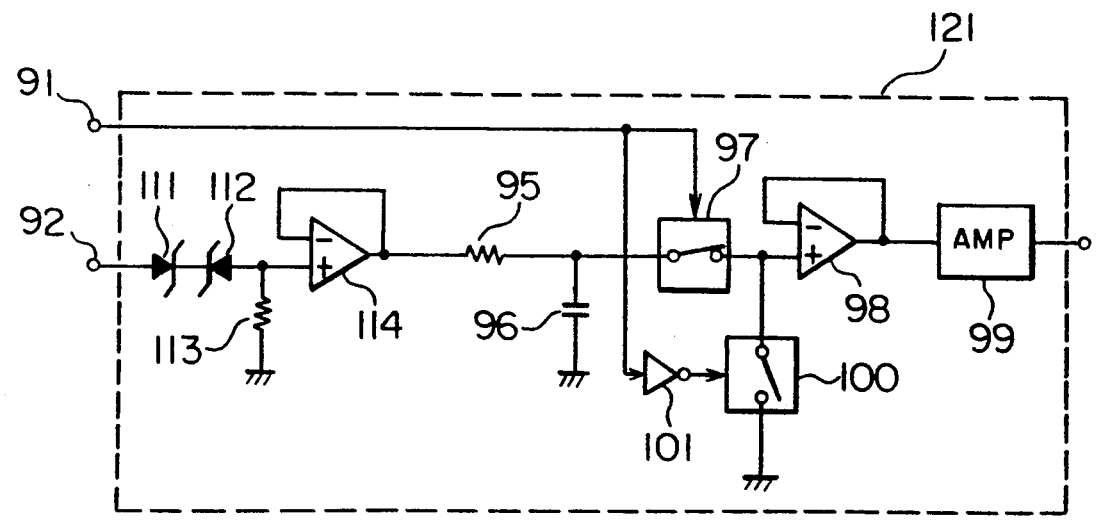
FIG. 15 is a block diagram showing another configuration of the extracting circuit 121.

FIG. 14 is a block diagram showing the configuration of the extracting circuit 121. The configuration of the extracting circuit 121 shown in FIG. 14 is obtained by omitting a switch 94 in the configuration of the extracting circuit 82 of FIG. 11. Owing to such a configuration, slip-off caused by the time delay of the low-pass filter can be reduced. That is to say, the DC-like component caused by asymmetry of the track deviation signal or the dynamic range of the phase compensating circuit 17 is extracted by the low-pass filter while retrieval is being performed. When tracking control is activated, therefore, the DC-like component is reduced in the differential amplifier 81 in a moment. As a result, the amount of slip-off of the frame 11 is reduced. Further, a similar effect can also be obtained by using a configuration shown in FIG. 15 as the extracting circuit 121. The configuration of the extracting circuit 121 shown in FIG. 15 is obtained by omitting the switch 94 in the configuration of the extracting circuit 82 of FIG. 12.

Figure 16:
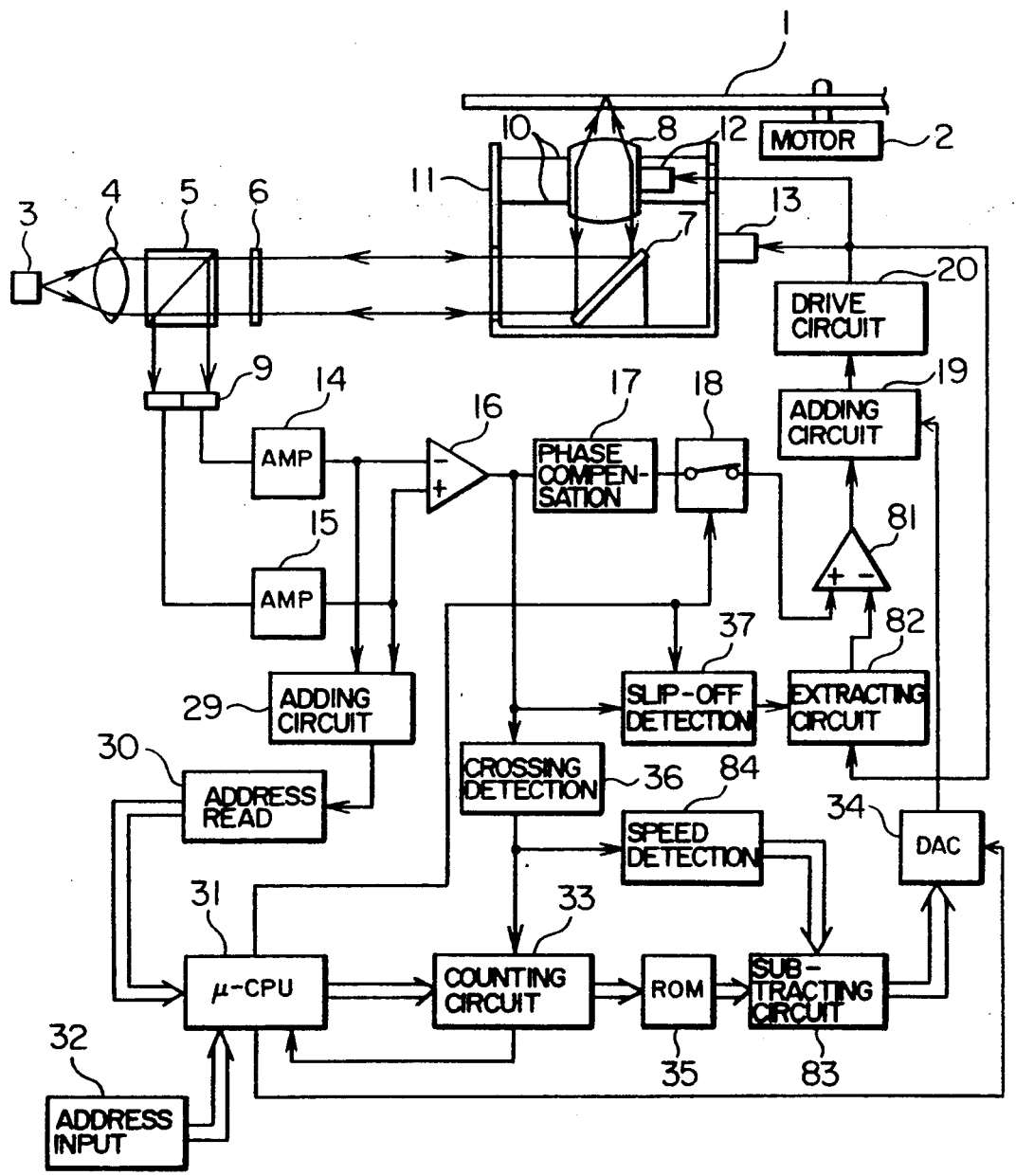
FIG. 16 is a block diagram showing the configuration of an embodiment of the present invention in which slip-off is prevented by providing a slip-off detecting circuit 37 and an extracting circuit 82 and by feeding back an extracted signal of a low frequency component only when slip-off occurs.

FIG. 16 is a block diagram of an embodiment so configured that the signal of the extracted low-frequency component is applied to the tracking control system only when slip-off has occurred. The slip-off detecting circuit 37 is supplied with the output signal of the differential amplifier 16 and the operation command signal of tracking control generated by the microcomputer 31. Upon occurrence of slip-off in the tracking control operation, the slip-off detecting circuit 37 detects the occurrence of slip-off from the output signal of the differential amplifier 16 and sends it to the extracting circuit 82. The extracting circuit 82 extracts a DC-like component from the output signal of the drive circuit 20, and sends this signal to the differential amplifier 81. Only when slip-off has occurred, therefore, the DC-like component is canceled or decreased. In the normal tracking control operation, therefore, the gain of the low frequency region is not lowered.

The configuration of the slip-off detecting circuit 37 will not be described because it has already been described by referring to FIGS. 6 and 8.

Further, it is clear that occurrence of slip-off can be detected by reading the address.

Even in the embodiment shown in FIG. 13, the lowering of the loop gain of tracking control in the low-frequency region can be prevented by so configuring the apparatus that the slip-off detecting circuit 37 may be provided and the output signal of the extracting circuit 82 may be supplied to the differential amplifier 81 only when slip-off has occurred in the same way as the embodiment of FIG. 16.

Figure 17:
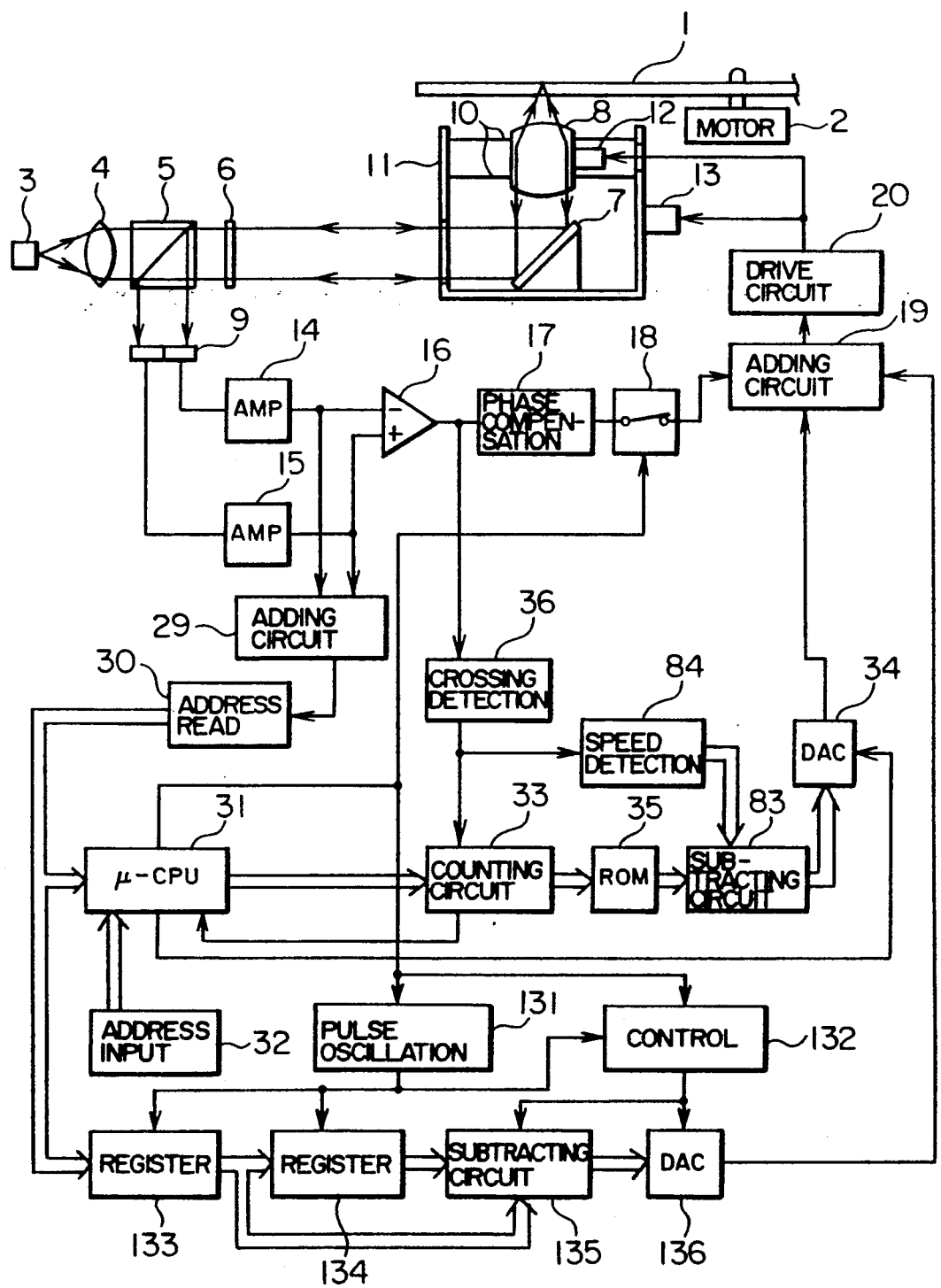
FIG. 17 a block diagram showing the configuration of an embodiment of the present invention in which slip-off is prevented by applying a signal depending upon the direction of slip-off to an actuator.

FIG. 17 is a block diagram of an embodiment so configured that not only occurrence of slip-off but also the direction of slip-off may be detected to apply a signal for preventing slip-off by reading the track address in the tracking control operation. The operation command signal of tracking control outputted from the microcomputer 31 is supplied to a pulse oscillator 131 and a control circuit 132. Upon activation of tracking control, the pulse oscillator 131 sends a pulse-shaped signal having a predetermined period to registers 133 and 134. An address read by the address read circuit 30 has already been inputted to the register 133. In synchronism with the pulse signal supplied from the pulse oscillator 131, the register 133 takes in and memories the output value of the address read circuit 30. The output value of the register 133 has already been inputted to the register 134. In synchronism with the pulse signal supplied from the pulse oscillator 131, the register 134 takes in and memorizes the output value of the register 133. Therefore, the value stored in the register 133 is stored in the register 134 at the time after one pulse. Assuming that the output value of the register 133 is D0 and the output value of the register 134 is D1, therefore, the value of (D0−D1) becomes an address difference changed during one period of the pulse signal supplied from the pulse oscillator 131, i.e., a value corresponding to the speed of slip-off. Further, the sign of the value of (D0−D1) represents the direction of movement of the optical beam on the recording carrier 1. The control circuit 132 is provided to control the operation of a subtracting circuit 135 and a D-A converter 136. After two pulses are outputted from the pulse oscillator 131 since the activation of tracking control, the control circuit 132 sends a signal for activating the subtracting circuit 135 and the D-A converter 136. As soon as the tracking control is inactivated, the control circuit 132 makes the subtracting circuit 135 and the D-A converter 136 inactive. Output signals of the registers 133 and 134 are inputted to the subtracting circuit 135. The subtracting circuit 135 calculates (D0−D1) and sends this value to the D-A converter 136. The D-A converter 136 converts a digital signal into an analog signal, and transfers the resultant analog signal to the coils 12 and 13 via the adding circuit 19 and the drive circuit 20. The output signal of the D-A converter 136 changes in accordance with the moving speed of the optical beam on the recording carrier 1, and the coils 12 and 13 are so driven as to stop the movement of the optical beam on the recording carrier 1.

In FIG. 17, detection of the movement speed and direction of the optical beam on the recording carrier 1 is performed by reading the address. However, the movement speed may be detected in the speed detection circuit 84, and the direction of movement may be detected by comparing the phase of the output signal of the differential amplifier 16 with the phase of the output signal of the adding circuit 29. Although normal tracking control is performed in this case, there is a possibility that an abnormal signal is generated in the speed detecting circuit 36 by noise or dropout. If the apparatus is configured to prevent this possibility so that the slip-off detecting circuit 37 may be provided and the coils 12 and 13 may be driven in accordance with the movement speed and the direction signal to prevent slip-off upon occurrence of slip-off as shown in FIG. 16, the reliability can be further improved.

By making the tracking control inactive and applying the output signal of the D-A converter 136 in FIG. 17 upon detection of slip-off and activating the tracking control again after the speed has been lowered to such a speed that the tracking control may be pulled in, pulling-in of tracking control can be attained more surely.

In each of the apparatus heretofore described, tracking control is performed by a single actuator. However, the present invention can be applied to an apparatus in which tracking control is performed by two actuators comprising a first actuator for moving the optical beam on the recording carrier 1 in the track width direction and a second actuator for moving the first actuator in the track width direction.

Figure 18:
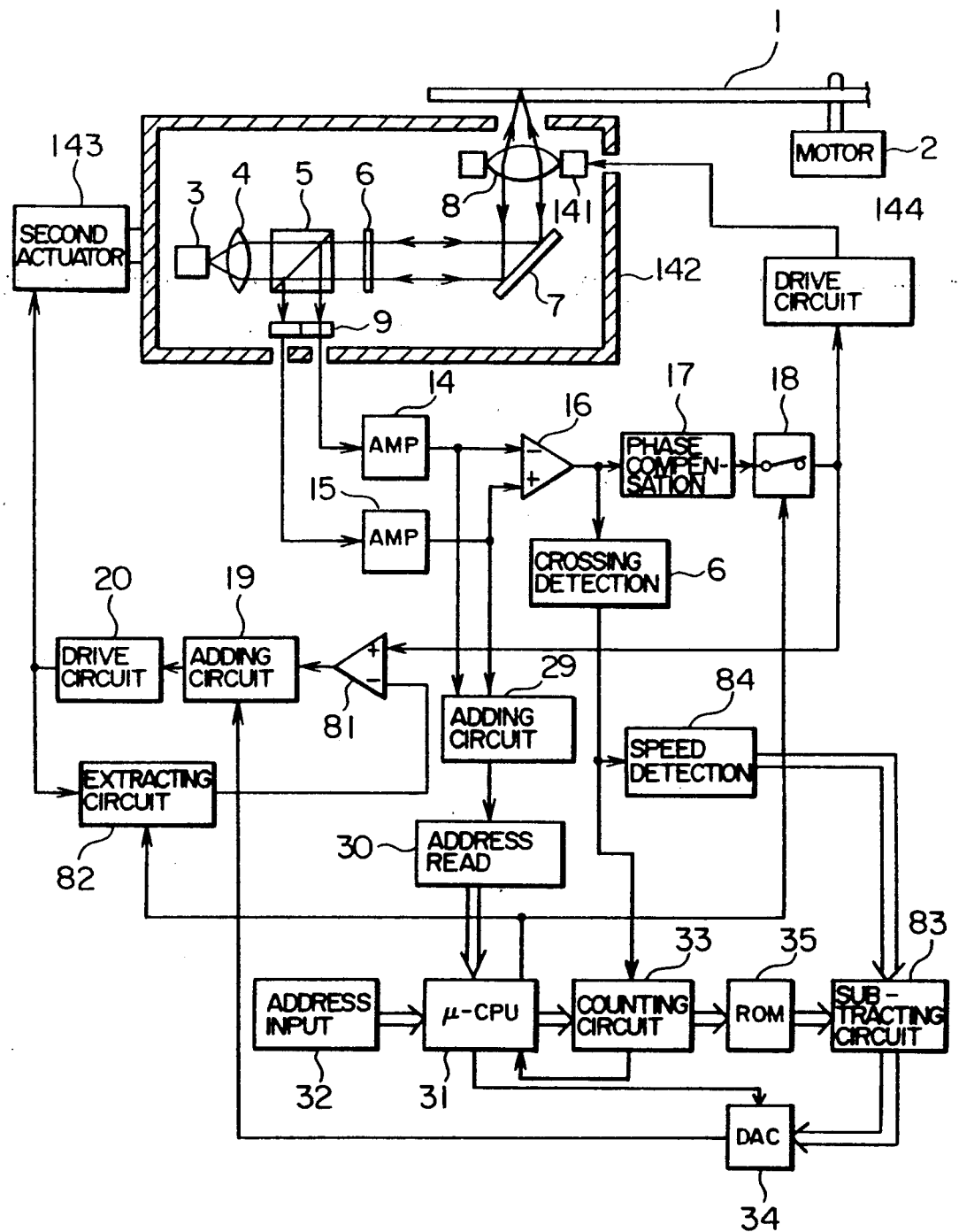
FIG. 18 is a block diagram showing the configuration of an embodiment of the present invention in which slip-off is prevented by applying the present invention to an apparatus for performing tracking control by using two actuators.

FIG. 18 is a block diagram obtained by applying the embodiment of FIG. 10 to an apparatus in which tracking control is performed by two actuators. A coil 141 of a first actuator is attached to the focusing lens 8. A permanent magnet is attached to a frame (not illustrated) of the first actuator. The frame of the first actuator is attached to a movable support 142. Further, the focusing lens 8 is attached to the frame of the first actuator via an elastic member (not illustrated) such as rubber. When a current is made to flow through the coil 141, the focusing lens 8 moves in the track width direction on the recording carrier 1. The movable range of the focusing lens 8 obtained by using the first actuator is approximately 0.2 mm at most.

The light source 3, the coupling lens 4, the polarizing beam splitter 5, the ¼ wavelength plate 6, the total reflection mirror 7, the optical detector 9, and a coil (not illustrated) of a second actuator 143 such as a linear motor are attached to the transfer base 142. A frame of the second actuator 143 whereto a permanent magnet is attached is fixed to an apparatus frame (not illustrated). When a current is made to flow through the coil of the second actuator 143, the transfer base 142 moves in the radius direction of the recording carrier 1.

Tracking control will now be described. The output signal of the differential amplifier 16 is supplied to the coil 141 via the phase compensating circuit 17, the switch 18 and a drive circuit 144 for performing power amplification. Therefore, the focusing lens 8 is so controlled that the optical beam on the recording carrier 1 may be positioned on a track. Further, the output signal of the switch 18 is supplied to the coil of the second actuator via the differential amplifier 81, the adding circuit 19 and the drive circuit 20. Therefore, the movable support 142 is so controlled that the position of the focusing lens 8 may vary around a proper position.

The output signal of the drive circuit 20 is supplied to the extracting circuit 82. In the tracking control operation, the extracting circuit 82 extracts a low-frequency component from the output signal of the drive circuit 20 and sends it to the differential amplifier 81. Since the low-frequency component of the output signal of the drive circuit 20 is thus reduced, slip-off of the movable support 142 can be prevented.

Even if the output signal of the differential amplifier 16 contains a DC-like component in case of the configuration in which tracking control is performed by the first actuator and the second actuator 143, the focusing lens 8 moves only to a position which is balanced with a spring force. On the other hand, the movable support 142 moved by the second actuator 143 moves over the entire movable range. The relation between a thrust F and a thrust constant (a thrust for a unit current) K of the second actuator 143, a current I made to flow through the coil of the second actuator 143 due to a DC-like component, weight M of the movable portion, and position X, speed V and acceleration $\alpha$ of the movable portion are shown by the following equations:

$$F = KI = M\alpha$$

$$V = \alpha t$$

$$X = \alpha t^2/2$$

If the current I is made small, therefore, the time elapsed until a speed exceeding the control range of the tracking control is reached is prolonged, as a result, pulling in of tracking control is facilitated.

The configuration of FIG. 18 is obtained by applying the embodiment of FIG. 10 to an apparatus in which tracking control is performed by using two actuators. In the same way, the embodiments of FIGS. 1, 5, 13, 16 and 17 can be applied to an apparatus in which tracking control is performed by using two actuators. That is to say, the apparatus may be configured so as to prevent slip-off of the movable support 142 caused by the second actuator 143.

Although the present invention has heretofore been described in detail, the present invention is not limited to the above-described embodiments.

For example, the apparatus of FIG. 1 may be so configured that the coils 12 and 13 may be driven by separate drive circuits, and a current flowing through either one of the coils and causing slip-off may be detected to decrease the current. Further, the apparatus of FIG. 1 may be so configured that a current for preventing slip-off may be made to flow through either one of the coils.

In some apparatuses in which tracking control is performed by using two actuators, a part of optical components is moved as in the configuration of FIG. 1. As a matter of course, however, the present invention can be applied to such a configuration as well.

Although the embodiment of FIG. 16 is so configured that slip-off may be detected to activate the extracting circuit 82, it can be so configured that the extracting circuit 82 may be omitted and the switch 18 may be opened to prevent slip-off upon detection of slip-off. If, in this case, tracking control is activated again when a predetermined time has elapsed or when lowering in the slip-off speed has been sensed, the circuit can be made simpler.

Further, the present invention can be applied to a magnetic recording and reproducing apparatus. In this case, a similar configuration is used in an actuator for moving a magnetic head.

Further, the present invention can be applied irrespective of the shape of the recording carrier. For example, the recording carrier may have a shape of a tape.

We claim:

1. A tracking control apparatus for performing a tracking control operation so as to position an irradiating optical beam on a track on a recording carrier to reproduce information therefrom, comprising:
   track deviation detecting means for detecting a positional deviation of the optical beam from a track;
   moving means for moving a movable member which causes the optical beam to move in a track width direction;
   position detecting means for detecting a position of said movable member moved by said moving means;
   a control circuit for driving said moving means in accordance with an output signal of said track deviation detecting means and for performing a control operation so as to always position the optical beam on the track; and
   a processing circuit having a high-pass filter for preventing passage of a signal in a low-frequency region, said processing circuit processing an output signal of said position detecting means and generating a processed output signal to be supplied to said moving means in the tracking control operation, wherein said processing circuit includes an address read circuit, a register circuit and a slippage detecting circuit, said address read circuit continuously reading out an address of a track on the recording carrier at which the optical beam is positioned, said register circuit registering a latest address number and an address number before the latest address number which are sent from said address read circuit, said slippage detecting circuit calculating an address number difference between the latest address number and the address number before the latest address number which are stored in said register circuit and detecting occurrence of slippage in the tracking control operation; and said processing circuit generates the processed output signal to be supplied to said moving means in accordance with an output signal of said slippage detecting circuit.

2. A tracking control apparatus for performing a tracking control operation so as to position an irradiating optical beam on a track on a recording carrier to reproduce information therefrom, comprising:
   track deviation detecting means for detecting a positional deviation of the optical beam from a track;
   moving means for moving the optical beam in a track width direction;
   a control circuit for driving said moving means in accordance with an output signal of said track deviation detecting means and for performing a control operation so as to always position the optical beam on the track; and
   an extracting circuit for extracting a low-frequency component of an output signal of said control circuit and generating an output signal which is fed back to said control circuit in the tracking control operation so as to reduce the low-frequency component of the output signal of said control circuit, wherein said extracting circuit includes an address read circuit, a register circuit and a slippage detecting circuit, said address read circuit continuously reading out an address of a track on the recording carrier at which the optical beam is positioned, said register circuit registering a latest address number and an address number before the latest address number which are sent from said address read circuit, said slippage detecting circuit calculating an address number difference between the latest address number and the address number before the latest address number which are stored in said register circuit and detecting occurrence of said slippage in the tracking control operation; and said extracting circuit generates the output signal to be supplied to said moving means in accordance with an output signal of said slippage detecting circuit.

3. A tracking control apparatus for performing a tracking control operation so as to position an irradiating optical beam on a track on a recording carrier to reproduce information therefrom, comprising:

track deviation detecting means for detecting a positional deviation of the optical beam from a track;

moving means for moving the optical beam in a track width direction;

a control circuit for driving said moving means in accordance with an output signal of said track deviation detecting means and for performing a control operation so as to always position the optical beam on the track;

a comparing circuit for comparing the output signal of said track deviation detecting means with a predetermined off-track level;

a removing circuit for removing a signal of a duration shorter than a predetermined time length and for providing an output signal of a duration longer than said predetermined time length, respectively, from an output signal of said comparing circuit;

a signal generating circuit, responsive to said output signal of said removing circuit, for generating an output signal indicating occurrence of slippage for a predetermined period of time in the tracking control operation; and a switch, responsive to an output signal of said signal generating circuit, for making the tracking control operation inactive.

4. A tracking control apparatus according to claim 3, wherein said comparing circuit is provided with two comparison levels V1 and V2 (where V1>V2) having symmetrical DC values with respect to a reference level, respectively, and compares the output signal Vx of said track deviation detecting means with the two comparison levels V1 and V2 to generate an output signal upon satisfaction of one of the relationships Vx>V1 and Vx<V2.

5. A tracking control apparatus for performing a tracking control operation so as to position an irradiating optical beam on a track on a recording carrier to reproduce information therefrom, comprising:

track deviation detecting means for detecting a positional deviation of the optical beam from a track;

moving means for moving the optical beam in a track width direction;

a control circuit for driving said moving means in accordance with an output signal of said track deviation detecting means and for performing a control operation so as to always position the optical beam on the track;

an address read circuit for continuously reading out an address of a track on the recording carrier at which the optical beam is positioned;

a register circuit for registering a latest address number and an address number before the latest address number which are sent from said address read circuit;

a signal generating circuit for calculating an address number difference between the latest address number and the address number before the latest address number which are stored in said register circuit and for generating an output signal indicating occurrence of slippage in the tracking control operation in accordance with said address number difference; and a switch, responsive to an output signal of said signal generating circuit, for making the tracking control operation inactive.

6. A tracking control apparatus for performing a tracking control operation so as to position an irradiating optical beam on a track on a recording carrier to reproduce information therefrom, comprising:

track deviation detecting means for detecting a positional deviation of the optical beam from a track;

moving means for moving the optical beam in a track width direction;

a control circuit for driving said moving means in accordance with an output signal of said track deviation detecting means and for performing a control operation so as to always position the optical beam on the track;

an address read circuit for continuously reading out an address of a track on the recording carrier at which the optical beam is positioned;

a register circuit for registering a latest address number and an address number before the latest address number which are sent from said address read circuit;

a slippage detecting circuit for calculating an address number difference between the latest address number and the address number before the latest address number which are stored in said register circuit, detecting a direction of slippage occurring in the tracking control operation in accordance with the value of the address number difference and generating a slippage direction indicating signal; and a signal generating circuit, responsive to the slippage direction indicating signal from said slippage detecting circuit, for generating an output signal to stop movement of the optical beam caused by said moving means.

7. A tracking control apparatus according to claim 6, wherein said moving means includes first moving means and second moving means, said first moving means moving the optical beam in a track width direction, said second moving means moving said first moving means in said track width direction, said control circuit driving said first and second moving means in accordance with the output signal of said track deviation detecting means, and the output signal of said signal generating circuit being supplied to said second moving means.

8. A tracking control apparatus according to claim 6, wherein said signal generating circuit generates an output signal in accordance with the value of the address number difference calculated by said slippage detecting circuit.

* * * * *